(12) United States Patent
Booker et al.

(10) Patent No.: US 8,238,892 B2
(45) Date of Patent: Aug. 7, 2012

(54) METHOD OF CONTROLLING AT LEAST ONE TERMINAL FROM A BASE STATION

(75) Inventors: Philip Booker, Southampton Hampshire (GB); Thomas M. Chapman, Southampton Hampshire (GB); Jörn Krause, Berlin (DE); Toby Kier Proctor, Salisbury Wilshire (GB)

(73) Assignee: Siemens Aktiengesellschaft, Munich (DE)

( * ) Notice: Subject to any disclaimer, the term of this patent is extended or adjusted under 35 U.S.C. 154(b) by 852 days.

(21) Appl. No.: 11/667,454

(22) PCT Filed: Oct. 19, 2005

(86) PCT No.: PCT/GB2005/004018
§ 371 (c)(1),
(2), (4) Date: Nov. 27, 2007

(87) PCT Pub. No.: WO2006/051256
PCT Pub. Date: May 18, 2006

(65) Prior Publication Data
US 2008/0248760 A1    Oct. 9, 2008

(30) Foreign Application Priority Data
Nov. 10, 2004    (GB) .................................. 0424779.7

(51) Int. Cl.
*H04M 3/00*        (2006.01)
(52) U.S. Cl. ......... 455/420; 455/442; 455/453; 455/443
(58) Field of Classification Search .................. 455/420, 455/442, 453, 443, 435.3
See application file for complete search history.

(56) References Cited

U.S. PATENT DOCUMENTS

2005/0025100 A1*    2/2005    Lee et al. ...................... 370/335

FOREIGN PATENT DOCUMENTS

| EP | 1 005 243 A1 | 5/2000 |
| EP | 1 447 938 A2 | 8/2004 |
| GB | 2 363 689 A | 1/2002 |
| GB | 2 402 579 A | 12/2004 |
| WO | 87/05458 | 9/1987 |
| WO | 2004/014097 A1 | 2/2004 |
| WO | 2004/064426 A1 | 7/2004 |
| WO | 2005/020490 A1 | 3/2005 |

OTHER PUBLICATIONS

Search Report for corresponding United Kingdom Patent Application No. GB0424779.7 dated Jun. 27, 2005.
"Feasibility Study for Enhanced Uplink for UTRA FDD (Release 6)" 3GPP TR 25.896 V1.0.0 (Sep. 2003); pp. 1-63.
International Search Report for Application No. PCT/GB2005/004018; mailed Feb. 2, 2006.

* cited by examiner

*Primary Examiner* — Yuwen Pan
(74) *Attorney, Agent, or Firm* — Staas & Halsey LLP

(57) ABSTRACT

One or more identifiers are set for each terminal and a priority ranking is allocated to each identifier to determine priority of one scheduling command relative to any other scheduling command. A data block is transmitted from the base station to the, or each, terminal, including the scheduling command and at least one identifier. Each terminal indicated by the identifier adapts its power level or data rate in accordance with the scheduling command.

10 Claims, 2 Drawing Sheets

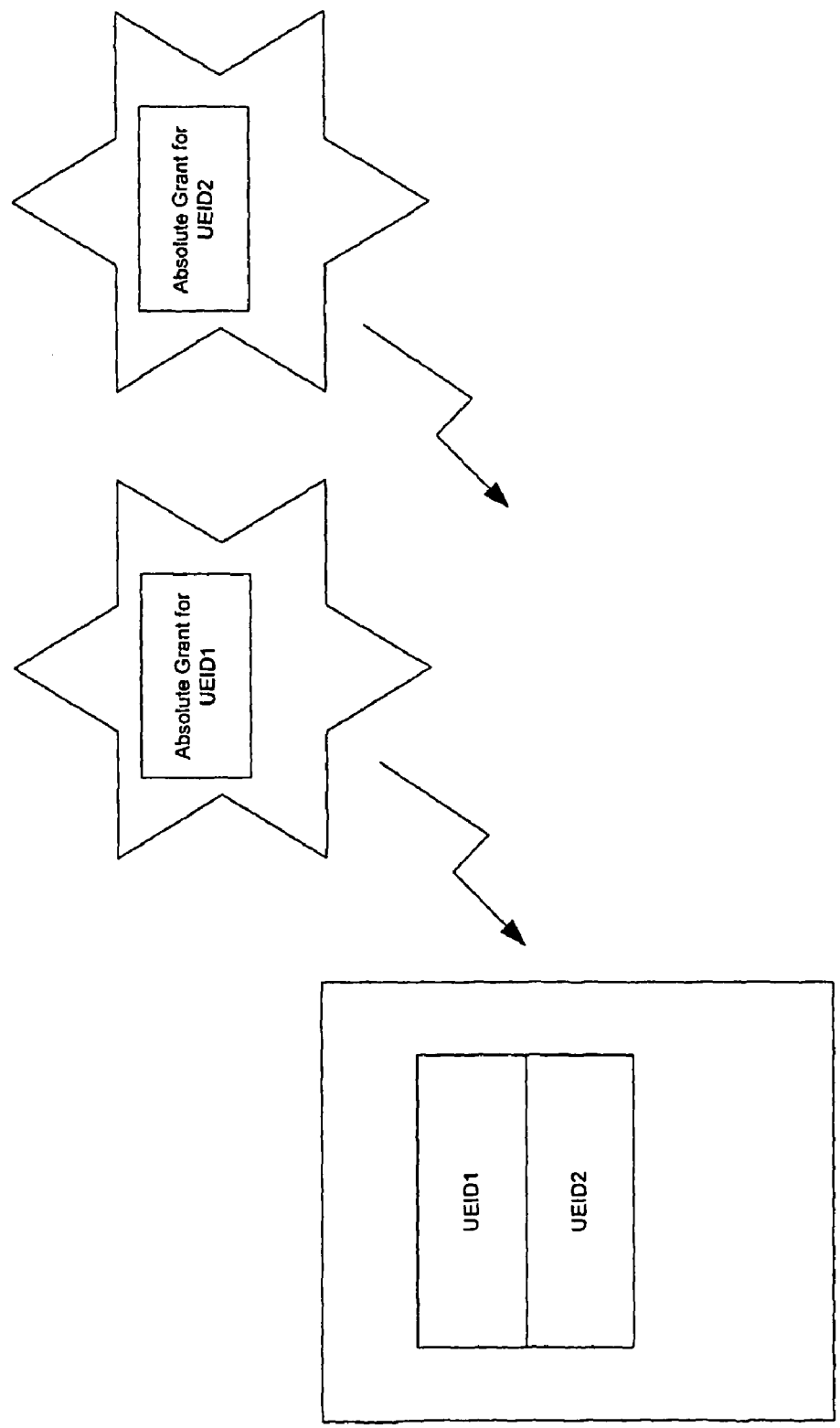

METHOD OF CONTROLLING AT LEAST ONE TERMINAL FROM A BASE STATION

CROSS REFERENCE TO RELATED APPLICATIONS

This application is based on and hereby claims priority to Great Britain Application No. 0424779.7 filed on Nov. 10, 2004, the contents of which are hereby incorporated by reference.

BACKGROUND

The method described below controls one or more terminals from a base station.

In the third generation partnership project (3GPP) work is ongoing relating to enhanced uplink (or enhanced dedicated channel (E-DCH)) for frequency division duplex (FDD). Improvements provide a feature for universal mobile telecommunication system (UMTS) that enhances uplink (UL) transmissions from the mobile station or user equipment (UE) to the base station, or Node B by the Node B scheduling the interference, transmit power received at the Node B and transport formats used. These three parameters are coupled. Furthermore, a hybrid automatic repeat request (HARQ) mechanism sends acknowledgements (ACK) or non-acknowledgements (NACK) from a Node B, or in case of soft handover, more than one Node B, to the UE to trigger retransmissions. There is also some consideration of implementing a shorter transmission time interval (TTI) of 2 ms, rather than a 10 ms TTI which is more usually considered to be standard. The effect of all these changes is to improve coverage and throughput, as well as to reduce delay in the UL.

However, it is necessary to provide a way of scheduling commands from the base station to the terminal.

SUMMARY

In accordance with a first aspect, a method of controlling one or more terminals from a base station includes setting one or more identifiers for each terminal; allocating a priority ranking to each identifier to determine priority of one scheduling command relative to any other scheduling command; and transmitting a data block from the base station to the, or each, terminal, including the scheduling command and at least one identifier; wherein each terminal indicated by the identifier adapts its power level or data rate in accordance with the scheduling command.

This ensures that changes in power level or data rate of a terminal can be controlled without having to apply the same changes to all terminals.

Preferably, each scheduling command includes a validity period.

This reduces the need for the base station to send commands, because the terminal will automatically revert to a default value on expiry of the validity period.

The default value could be one which is preset for all terminals, but preferably, each terminal indicated by an identifier in a scheduling command reverts to the power level and data rate of its lowest priority identifier, on expiry of the validity period of that scheduling command.

Certain terminals may have a need for a higher basic power level and data rate, so this can be set individually, as the lowest priority identifier.

The terminal could respond substantially instantaneously to a change indicated by a scheduling command, but preferably, each terminal indicated by an identifier in a new scheduling command changes its power level or data rate in accordance with the new scheduling command, only when a validity period for a previous scheduling command for that terminal expires.

This allows the base station to plan ahead in terms of resources.

Although the scheduling command could set a relative change, such as increase or decrease power by a fixed amount, preferably, the scheduling command sets an absolute power level or data rate.

The terminal could be a static terminal, but preferably, the terminal is a mobile terminal.

Preferably, the identifiers for a terminal in soft handover are identifiers from different base stations and their relative priorities.

When in soft handover, the terminal may receive scheduling information from more than one base station, so it needs to know which takes precedence.

BRIEF DESCRIPTION OF THE DRAWINGS

These and other objects and advantages will become more apparent and more readily appreciated from the following description of the preferred embodiments, with reference to the accompanying drawings in which:

FIG. 3 illustrates how priorities are allocated and used.

DETAILED DESCRIPTION OF THE PREFERRED EMBODIMENT

Figure 1:
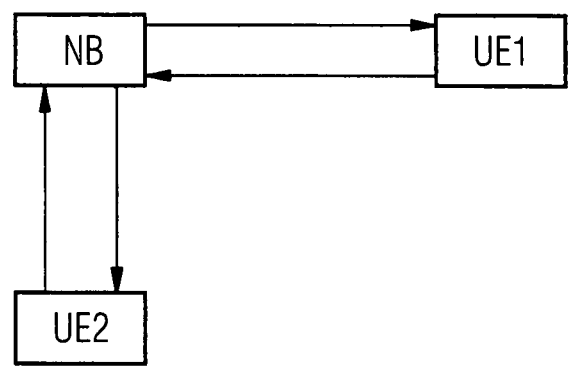
FIG. 1 is a block diagram of a first example of the method.

Reference will now be made in detail to the preferred embodiments, examples of which are illustrated in the accompanying drawings, wherein like reference numerals refer to like elements throughout.

In FIG. 1, a node B NB schedules a pair of terminals UE1 and UE2, typically mobile terminals within a cell. If UE1 is causing interference, the node B can send a scheduling command to UE1 which reduces its data rate and power level to the specified lower ones, without affecting UE2. Alternatively, if NB has spare resources it can send a command, indicating to both UE1 and UE2 that they can increase their power levels and data rate to the same, higher, value.

Figure 2:
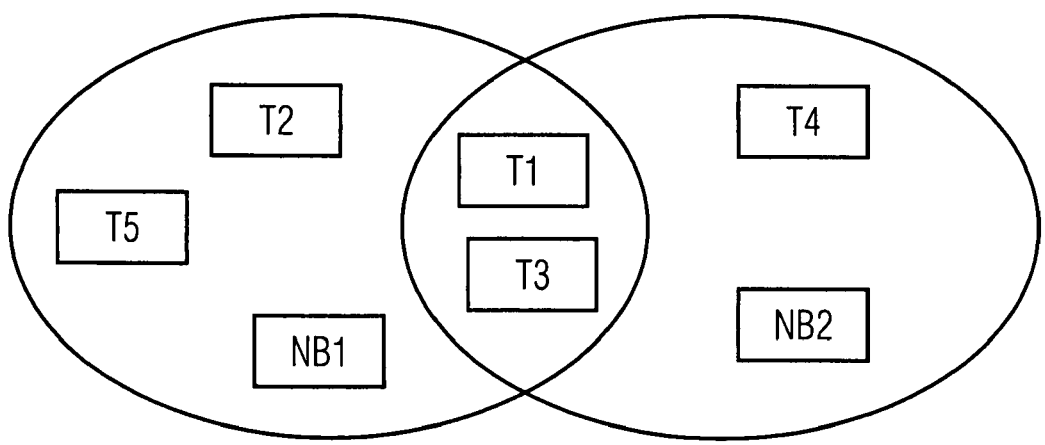
FIG. 2 is a set diagram showing a soft handover.

FIG. 2 illustrates the problem of soft handover, where terminals T1 and T3 might receive scheduling commands from both NB1 and NB2. Using the method, the terminals will be given an identifier and priority ranking, so that they know which node B to follow.

Different ways of scheduling commands, or grants, sent from the Node B to the UE are possible. An absolute scheduling grant indicates an absolute setting of UL transmit power limit or UL transport format limit, whereas a relative scheduling grant gives an up or hold or down command for setting UL transmit power limit or UL transport format limit.

For the absolute scheduling grant, a corresponding scheduling identification, currently called UE Id, is sent together with the command to indicate the UE to which the scheduling grant applies. The scheduling grants can affect an individual UE (individual scheduling identification), a configured group of UEs ('group scheduling identification'), or all UEs which are under control of the scheduling Node B ('common scheduling identification'). Thus, there is a hierarchical scheduling identification giving different levels of grants. The UE receives configuration information (e.g. when the E-DCH channel is set up or reconfigured) in which a prioritized list of scheduling identifications is provided to indicate which scheduling identification has a higher priority, if the UE has or receives different grants with overlapping validity periods. Alternatively, the absolute grants may remain valid until the next absolute grant occurs, rather than being given a specific validity period.

One example of using a list of prioritised UE IDs is one in which one of the IDs is used for scheduling a group of UEs. All of the UEs in the group are given a common ID as one of their UE IDs and individual Ids as another of their UE IDs. Their behaviour on receiving an absolute grant containing a UE ID will differ depending on whether the grant contains the common ID or an individual ID and the priority of the common/individual IDs.

In FIG. 3, a UE, e.g. UE1 is allocated 2 IDs with different priorities. The higher priority is UEID1 and the lower priority is UEID2, i.e. ID1 has a higher priority than ID2. The UE receives an absolute grant for UEID1, which has priority 1, so the UE responds. It also receives an absolute grant for UEID2, with priority 2, but the UE does not respond to this because it already has a valid grant with a higher priority number.

The present discussion assumes that absolute scheduling grants are received only from the serving Node B and relative grants from all cells/Node Bs. Hence non-serving Node Bs could stop interference increasing absolute grants from serving cell/Node B e.g. by an overload indication provided via their relative grants.

Advantages of the method described above include a reduction and simplification of scheduling grants. A group or all UEs can be addressed by one grant only which is quicker in overload situations and saves downlink power and radio resources in general. Although the scheduler in the Node B is implementation specific, corresponding signalling for the configuration is needed in the standard and cost savings in the sense of radio resources can be achieved.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method of controlling one or more terminals from a base station using scheduling commands, the method comprising:
    transmitting a data block from the base station to the one or more terminals, including the scheduling command and an identifier, each terminal indicated by the identifier correspondingly adapting a power level or a data rate in accordance with the scheduling command;
    setting two or more identifiers for each terminal; and
    allocating a priority ranking to each identifier to determine a priority of one scheduling command relative to any other scheduling command, and
    wherein each terminal only correspondingly adapts the power level or the data rate in accordance with the scheduling command when the priority of the identifier transmitted is higher than a priority of an existing valid grant respective to each terminal.

2. The method according to claim 1, wherein each scheduling command includes a validity period.

3. The method according to claim 2, wherein each terminal indicated by the identifier in the scheduling command reverts to the power level and the data rate of when a lowest priority identifier, on expiry of the validity period of the scheduling command.

4. The method according to claim 2, wherein each terminal in a new scheduling command changes a power level or a data rate in accordance with the new scheduling command, only when a validity period for a previous scheduling command for that terminal expires.

5. The method according to claim 1, wherein the scheduling command sets an absolute power level or data rate.

6. The method according to claim 1, wherein the terminal is a mobile terminal.

7. The method according to claim 6, wherein the identifiers for a terminal in soft handover are identifiers from different base stations and relative priorities.

8. The method according to claim 1, comprising:
    ignoring the scheduling command by the one or more terminals when determining that a priority of an existing valid grant of the one or more terminals is ranked higher than the priority of the identifier transmitted.

9. The method according to claim 1, comprising:
    selectively adapting a power level or a data rate of a terminal indicated among a group of terminals in the one or more terminals using the scheduling command when the identifier transmitted corresponds to the terminal, where only the terminal among the group of terminals is configured to change the power level or the data rate in accordance with the scheduling command.

10. A method of controlling terminals from a base station using a scheduling command, comprising:
    determining whether a scheduling command and an identifier that indicates one of a group of terminals has a priority higher than a priority of an existing valid grant, at least two identifiers having a respective priority being assigned to each of said group of terminals; and
    changing one of a power level and a data rate of said one of the group of terminals when the determining indicates a higher priority than the existing grant respective to each terminal and ignoring said changing when a lower priority than the existing grant.

* * * * *